US012663091B2

(12) United States Patent
Hohteri et al.

(10) Patent No.: US 12,663,091 B2
(45) Date of Patent: Jun. 23, 2026

(54) SENSOR ARRANGEMENT FOR A HOLLOW BODY

(71) Applicant: Sstatzz Oy, Helsinki (FI)

(72) Inventors: Harri Hohteri, Helsinki (FI); Jukka Väisänen, Kiviniemi (FI)

(73) Assignee: Sstatzz Oy, Helsinki (FI)

( * ) Notice: Subject to any disclaimer, the term of this patent is extended or adjusted under 35 U.S.C. 154(b) by 0 days.

(21) Appl. No.: 18/761,433

(22) Filed: Jul. 2, 2024

(65) Prior Publication Data

US 2024/0353016 A1 Oct. 24, 2024

Related U.S. Application Data

(63) Continuation-in-part of application No. 17/858,587, filed on Jul. 6, 2022, now Pat. No. 12,055,239.

(51) Int. Cl.
| | |
|---|---|
| *F16K 15/20* | (2006.01) |
| *A63B 41/00* | (2006.01) |
| *A63B 41/02* | (2006.01) |
| *A63B 41/08* | (2006.01) |
| *A63B 41/10* | (2006.01) |
| *A63B 43/00* | (2006.01) |
| *B60C 23/04* | (2006.01) |
| *F16K 37/00* | (2006.01) |
| *G01D 11/30* | (2006.01) |

(52) U.S. Cl.
CPC ............ *F16K 15/202* (2013.01); *A63B 41/00* (2013.01); *A63B 41/02* (2013.01); *A63B 41/08* (2013.01); *A63B 41/085* (2013.01); *A63B 41/10* (2013.01); *A63B 41/125* (2020.08);

*A63B 43/007* (2013.01); *B60C 23/0494* (2013.01); *B60C 23/0496* (2013.01); *F16K 37/0075* (2013.01); *G01D 11/30* (2013.01)

(58) Field of Classification Search
None
See application file for complete search history.

(56) References Cited

U.S. PATENT DOCUMENTS 2,295,804 A * 9/1942 Olson ................... F16K 15/202
473/610

FOREIGN PATENT DOCUMENTS

FR 3052214 A1 * 12/2017 ............. F16H 59/70

* cited by examiner

*Primary Examiner* — Atif H Chaudry
(74) *Attorney, Agent, or Firm* — Ziegler IP Law Group, LLC.

(57) ABSTRACT

Disclosed is an apparatus for installing a valve in a hollow body. The apparatus has a first member and a second member, wherein a part of lengths of the first and second members are complementary to each other to accommodate the first member circumferentially over the second member at the complementary part. The second member is configured to be inserted in a hole on an outer surface of the hollow body; advanced inside the hollow body while retaining the first member against the hole; and withdrawn from the hollow body while retaining the first member against the hole. The apparatus is configured to install the valve into the hollow body while the first member is retained against the hole, and wherein the first member is withdrawn upon installation of the valve into the hollow body.

5 Claims, 20 Drawing Sheets

100

108

106

102

104

110

118

116

112

114

200

206B

204

208

202

206

206A

800

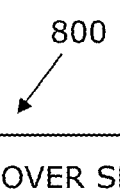

ARRANGE FIRST MEMBER CIRCUMFERENTIALLY OVER SECOND
MEMBER AT COMPLEMENTARY PART, FIRST MEMBER HAVING FIRST
HOLLOW ELONGATE TUBE OF FIRST LENGTH AND FIRST DIAMETER
AND SECOND MEMBER HAVING FIRST END, SECOND END, AND
SECOND HOLLOW ELONGATE TUBE OF SECOND LENGTH BETWEEN
FIRST END AND SECOND END AND SECOND DIAMETER
802

INSERT SECOND MEMBER, VIA FIRST END THEREOF, IN HOLE ON
OUTER SURFACE OF HOLLOW BODY
804

ADVANCE SECOND MEMBER INSIDE HOLLOW BODY WHILE
RETAINING FIRST MEMBER AGAINST HOLE OF HOLLOW BODY TO
EXPAND HOLE
806

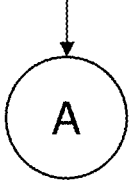

WITHDRAW SECOND MEMBER FROM HOLLOW BODY WHILE
RETAINING FIRST MEMBER AGAINST HOLE OF HOLLOW BODY
808

INSTALL VALVE INTO HOLLOW BODY VIA FIRST HOLLOW ELONGATE
TUBE OF FIRST MEMBER RETAINED AGAINST HOLE OF HOLLOW
BODY
810

WITHDRAW FIRST MEMBER UPON INSTALLATION OF VALVE INTO
HOLLOW BODY
812

SENSOR ARRANGEMENT FOR A HOLLOW BODY

TECHNICAL FIELD

The aspects of the disclosed embodiments relate to an apparatus for installing a valve in a hollow body. The aspects of the disclosed embodiments also relate to a method for installing a valve in a hollow body. The aspects of the disclosed embodiments also relate to a sensor arrangement for sensing data inside a hollow body.

BACKGROUND

Generally, there are a large number of hollow bodies such as balloons or balls (such as those used in various sports like football, basketball, volleyball, and so on), that are filled with some gas like air. In this regard, generally a valve is required for controlling the flow of air into the hollow body.

Typically, the valve is installed in the hollow body to fill air inside the hollow body. Moreover, there are a variety of properties associated with the hollow body that can be tracked in order to improve the performance and quality of the hollow body for the desired purpose thereof, that is not achieved using the conventional valves. As a result, there are valves that are designed with sensor arrangements that are integrated to such valves itself, allowing the sensor arrangement to sense the properties associated with the hollow body. However, there still exists a need for a mechanism which ensures that during the installation of the valve that includes an integrated sensor arrangement in the hollow body, the sensor arrangement is not being caused any harm in the process of installing the valve. Moreover, there exists a need for providing a solution that enhances the reusability of the valve with the integrated sensor arrangement without the need for replacing the valve.

Therefore, in light of the foregoing discussion, there exists a need to overcome the aforementioned drawbacks associated with the conventional ways of installing the valve in the hollow body and reusability of the valve.

SUMMARY

The present disclosure relates to an apparatus for installing a valve in a hollow body. The present disclosure also relates to a method for installing a valve in a hollow body. The present disclosure also relates to a sensor arrangement for sensing data inside a hollow body. An aim of the present disclosure is to provide a solution that overcomes at least partially the problems encountered in prior art.

In a first aspect, an embodiment of the present disclosure provides an apparatus for installing a valve in a hollow body, the apparatus comprising:

a first member having a first hollow elongate tube of a first length and a first diameter; and a second member having a first end, a second end, and a second hollow elongate tube of a second length between the first end and the second end and a second diameter, wherein a part of the second length of the second member and a part of the first length of the first member are complementary to each other to accommodate the first member circumferentially over the second member at the complementary part, and wherein the second member is configured to be inserted, via the first end of the second member, in a hole on an outer surface of the hollow body;

advanced inside the hollow body while retaining the first member against the hole of the hollow body to expand the hole; and withdrawn from the hollow body while retaining the first member against the hole of the hollow body, wherein the apparatus is configured to install the valve into the hollow body via the first hollow elongate tube of the first member retained against the hole of the hollow body, and wherein the first member is withdrawn upon the installation of the valve into the hollow body.

In a second aspect, an embodiment of the present disclosure provides a method for installing a valve in a hollow body, the method comprising:

arranging a first member circumferentially over a second member at a complementary part, the first member having a first hollow elongate tube of a first length and a first diameter and the second member having a first end, a second end, and a second hollow elongate tube of a second length between the first end and the second end and a second diameter;

inserting the second member, via the first end thereof, in a hole on an outer surface of the hollow body;

advancing the second member inside the hollow body while retaining the first member against the hole of the hollow body to expand the hole;

withdrawing the second member from the hollow body while retaining the first member against the hole of the hollow body, installing the valve into the hollow body via the first hollow elongate tube of the first member retained against the hole of the hollow body; and withdrawing the first member upon the installation of the valve into the hollow body.

In a third aspect, an embodiment of the present disclosure provides a sensor arrangement for sensing data inside a hollow body, wherein the sensor arrangement is at least partly integrated on an inner surface of a valve, the sensor arrangement comprising:

a circuit board having at least one antenna pad at a first end of the hollow elongate circuit board;

at least one sensor embedded on the circuit board, the at least one sensor configured to sense data related to one or more attributes associated with the hollow body; and a communication interface embedded on the circuit board, the communication interface configured to transmit the sensed data.

Embodiments of the present disclosure substantially eliminate or at least partially address the aforementioned problems in the prior art and aims to simplify the installation process of a valve in a hollow body without damaging the sensor arrangement at least partly integrated to the valve and eliminate the need for replacing the valve in the hollow body again and again each time the battery of the sensor arrangement is completely drained out. Moreover, the embodiments of the present disclosure also provide sensing and tracking of data related to the hollow body.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIGS. 8A and 8B illustrates a flowchart depicting steps of a method for installing a valve in a hollow body, in accordance with an embodiment of the present disclosure, FIGS. 9A, 9B, 9C, 9D, 9E, and 9F provide examples of a valve, sensor arrangement, charging plug and inflation needle in accordance with the aspects of the disclosed embodiments.

Figure 1A:
FIGS. 1A and 1B are schematic illustrations of a first member and a second member, respectively, present in an apparatus for installing a valve in a hollow body, in accordance with an embodiment of the present disclosure.
Figure 1A:
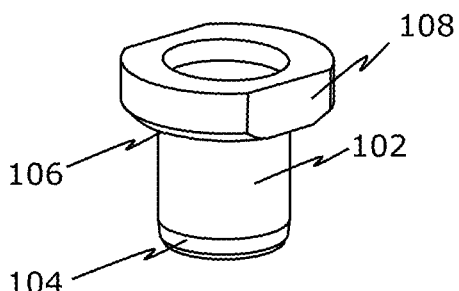

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect of the disclosed embodiments a valve is disclosed. The valve comprises a sensor arrangement for sensing data inside a hollow body, wherein the sensor arrangement is embedded inside a body of the valve;

a port having a first opening for receiving a charger plug or inflation needle, and a stopper part, wherein the stopper part comprises a channel which is dimensioned to allow the inflation needle to penetrate the hollow body while preventing the charger plug from penetrating the hollow body;

wherein the stopper part is made from an elastic material to keep the channel airtight when the inflation needle is removed from the channel. This allows to use the valve for both charging batteries of the sensor arrangement as well as to inflate the hollow body (such as a ball) via the valve. A charger plug, when inserted in the port provides electricity to chargeable batteries via charging pads.

The valve comprises a stopper part which is made from elastic material. The stopper part comprises a small channel or opening via which an inflation needle can be inserted. When the needle is removed the channel closes in airtight manner. The stopper part can be made for example from elastic rubber. The channel is dimensioned to be so small that charger plug cannot penetrate thru it without using excess force. Typical diameter of the charger plug is in the range of 3.5 mm to and including 2.5 mm. The inflation needle diameter is less than 2 mm, typically 1 mm.

The sensor arrangement comprises a printed circuit board, charging pads arranged to be electrically connected to the charger plug via the port, a sensor, a communication interface, an antenna and a chargeable battery.

The body of the valve is preferably moulded polymer covering the sensor arrangement.

The stopper part and the body of the valve can be made optionally from same material. i.e. material of the body and the valve can be same i.e. for example elastomeric polymer or a like. In this situation then body and the stopper can be made in a single step via moulding process. (Embedding at the same time the sensor arrangement inside of the valve)

Another aspect of the disclosed embodiments is directed to an apparatus for installing a valve in a hollow body, wherein the apparatus comprises:

a first member having a first hollow elongate tube of a first length and a first diameter; and a second member having a first end, a second end, and a second hollow elongate tube of a second length between the first end and the second end and a second diameter, wherein a part of the second length of the second member and a part of the first length of the first member are complementary to each other to accommodate the first member circumferentially over the second member at the complementary part, and wherein the second member is configured to be inserted, via the first end of the second member, in a hole on an outer surface of the hollow body;

advanced inside the hollow body while retaining the first member against the hole of the hollow body to expand the hole; and withdrawn from the hollow body while retaining the first member against the hole of the hollow body, wherein the apparatus is configured to install the valve into the hollow body via the first hollow elongate tube of the first member retained against the hole of the hollow body, and wherein the first member is withdrawn upon the installation of the valve into the hollow body.

In a second aspect, an embodiment of the present disclosure provides a method for installing a valve in a hollow body, the method comprising:

arranging a first member circumferentially over a second member at a complementary part, the first member having a first hollow elongate tube of a first length and a first diameter and the second member having a first end, a second end, and a second hollow elongate tube of a second length between the first end and the second end and a second diameter;

inserting the second member, via the first end thereof, in a hole on an outer surface of the hollow body;

advancing the second member inside the hollow body while retaining the first member against the hole of the hollow body to expand the hole;

withdrawing the second member from the hollow body while retaining the first member against the hole of the hollow body, installing the valve into the hollow body via the first hollow elongate tube of the first member retained against the hole of the hollow body; and withdrawing the first member upon the installation of the valve into the hollow body.

In a further aspect, an embodiment of the present disclosure provides a sensor arrangement for sensing data inside a hollow body, wherein the sensor arrangement is at least partly integrated on an inner surface of a valve, the sensor arrangement comprising:

a circuit board having at least one antenna pad at a first end of the hollow elongate circuit board;

at least one sensor embedded on the circuit board, the at least one sensor configured to sense data related to one or more attributes associated with the hollow body; and a communication interface embedded on the circuit board, the communication interface configured to transmit the sensed data.

The present disclosure provides the aforementioned apparatus, the aforementioned sensor arrangement, and the aforementioned method. Embodiments of the present disclosure aim to simplify the process of installation of a valve in a hollow body without damaging the sensor arrangement at least partly integrated to the valve and eliminate the need for replacing the valve in the hollow body again and again each time the battery of the sensor arrangement is completely drained out. Moreover, the present disclosure aims at providing a means for sensing, via the sensor arrangement integrated to the valve, and tracking various attributes associated with hollow body. Herein, the sensor arrangement at least partly integrated to the valve is designed such as to keep the weight of the hollow body minimum while maintaining a right balance of the hollow body.

The apparatus of the present disclosure is for installing a valve in a hollow body. Herein, the term "hollow body" refers to a 3-dimensional body with no fixed shape or size that is hollow from inside. The hollow body for example may be a spherical ball or a balloon. The hollow space that is present inside the hollow body may be filled with air or a gaseous substance (e.g., helium). Optionally, the hollow body is made of a stretchable material, which stretches on being filled with air i.e., the hollow body is inflatable in nature. Optionally, the stretchable material may be a plastic, a rubber, a silicon, and so on. Optionally, the hollow body may be a sporting projectile such as a basketball, a volleyball, a football, and so forth.

Herein, the term "valve" refers to a part that acts as a mechanism for controlling a flow of a gas like air for filling the hollow body. Subsequently, the present apparatus relates to installation of the valve in the hollow body, thus allowing the valve to provide and control the flow of the air or any other gas inside the hollow body.

The apparatus comprises a first member and a second member. Herein, the terms "first member" and "second member" refer to parts that are used for coupling two mechanical components together. Optionally the first member and the second member may be made of a steel, a plastic, or a sheet metal or an alloy. Herein, the first length of the first member is shorter than but complementary to the second length of the second member, but the inner diameter of the first member (implemented as a mounting sleeve having a substantially cylindrical cross-section complementary to a part of length of the second member) is larger than the outer diameter of the second member (designed like a conical tool, wherein a part of length of said conical tool is complementary to the inner diameter of the first member) in order to accommodate the first member circumferentially over the second member at the complementary part of lengths thereof. Optionally, the first end of the second member has a pointed nib, thus allowing the first end of the second member to easily penetrate into the hollow body through the hole. Optionally the second end of the second member has a protruding part with an inner diameter larger than an inner diameter of the first end of the second member. Similarly, a second end of the first member has a protruding part with an inner diameter larger than an inner diameter of a first end of the first member. In some embodiments, the first member and the second member may appear as hollow screws with broader proximal ends (referred to as the protruding parts at the second ends of the first member and the second member) and tapered distal ends (such as the first end of the first member and the second member) thereof. Subsequently, the accommodation of the first part circumferentially over the second part may result in the protruding part of the second member to be stuck against the protruding part of the first member.

Moreover, the second member is configured to be inserted, via the first end of the second member, in a hole on an outer surface of the hollow body. Herein, the first end of the second member is used to puncture the hole on the outer surface of the hollow body and subsequently inserted into the hole.

Optionally, the second member is further configured to create an air pressure inside the hollow body. Herein, the second member creates the air pressure inside the hollow body while the second member is being inserted in the hollow body, in order for the second member to be easily inserted in the hollow body. Herein, the pointed nib at the first end of the first member may have an opening that allows air to flow in order to create an air pressure inside the hollow body.

Furthermore, the second member is configured to be advanced inside the hollow body while retaining the first member against the hole of the hollow body to expand the hole. Herein, the second member is advanced inside hollow body till at least a part of the first member also enters the hollow body and the protruding part of the first member is retained against the hole of the hollow body.

Furthermore, the second member is configured to be withdrawn from the hollow body while retaining the first member against the hole of the hollow body. Herein, due to the larger diameter of the protruding part of the first member as compared to the diameter along the second length of the second member, the first member is retained along the hole of the hollow body with a sufficient part thereof inside the hollow body, while the second member is withdrawn from the hollow body. It will be appreciated that the retention of the first member against the hole of the hollow body enables expanding the hole of the hollow body to enable introducing one or more tools therein for a desired application of such tools. In an embodiment, the tool may be a valve.

The apparatus is configured to install the valve into the hollow body via the first hollow elongate tube of the first member retained against the hole of the hollow body.

Herein, the valve has cross-section complementary to the cross-section of the first hollow elongate tube of the first member to allow insertion thereof into the first hollow elongate tube and subsequently entry thereof inside the hollow body. Moreover, the first member is withdrawn upon the installation of the valve into the hollow body. It will be appreciated that at this stage the material of the hollow body gets wrapped around the valve when the first member withdrawn.

Optionally, the apparatus further comprises a nozzle configured to be inserted into the valve, wherein the nozzle is designed to enable at least one of: filling air in the hollow body, attaching an external arrangement to the valve. Herein, the nozzle is designed to have a cross-section complementary to the cross-section of the valve to allow insertion thereof into the valve and subsequently entry thereof inside the hollow body, to serve the desired purpose of the nozzle. For example, in order to fill air inside the hollow body, the nozzle might be designed to have a hole at a bottom end of the nozzle that allows the air to flow therethrough into the hollow body.

Alternatively or additionally, optionally, the nozzle might be designed to have the external arrangement on boundary walls of the nozzle and inserting the nozzle into the valve allows the external arrangement that is present on the boundary wall of the nozzle to be attached to the valve.

The present disclosure also relates to the sensor arrangement as described above. Various embodiments and variants disclosed above apply mutatis mutandis to the sensor arrangement.

The sensor arrangement of the present disclosure is for sensing data inside a hollow body. Herein, the term "sensor arrangement" refers to an arrangement that is capable of sensing, measuring and transmitting data that is related with one or more attributes associated with the hollow body. Optionally the one or more attributes associated with the hollow body may be air pressure inside the hollow body, velocity or acceleration with which the hollow body moves, degree of curve in movement of the hollow body or position of the hollow body.

Optionally, the data that is sensed by the sensor arrangement is stored in the sensor arrangement itself to be red at a later stage when the purpose of using the hollow body (e.g., using the hollow body as a ball for a sporting activity). Optionally, the sensed data that is stored inside the sensor arrangement may be processed and analysed by the sensor arrangement in order to draw inferences related to the performance of the hollow body based on the certain associated attributes that are sensed by the sensing arrangement.

The sensor arrangement is at least partly integrated on an inner surface of a valve. Herein, the term "at least partly integrated" refers that at least some part of the sensor arrangement is integrated to at least some part of the inner surface of the valve. Optionally, the integration of the sensor arrangement to the valve may be in the form of the sensor arrangement being embedded or bolted to the valve.

The sensor arrangement comprises a circuit board having at least one antenna pad at a first end of the circuit board. Herein, the term "circuit board" refers to a board made from copper sheets that mechanically supports and allows the electrical connection for the electronic components (e.g., sensors, integrated circuits). The circuit board is preferably moulded into a flexible 3-Dimensional (3D) polygonal structure having a first end and a second end. Moreover, the circuit board has the at least one antenna pad on the first end. Herein, the term "antenna pad" refers to an interface that allows radio communication for the transmission of the sensed data by the sensing arrangement. Optionally, the antenna pad may be made from ceramic and may be integrated to the circuit board. Optionally, the antenna pad may read the sensed data stored in the sensor arrangement asynchronously to be further transmitted.

Optionally, the circuit board is manufactured using 3-Dimensional (3D) printing. Optionally, the circuit board is a hollow elongate circuit board, i.e., the 3D polygonal structure of the circuit board is of a certain length and is hollow from inside.

Moreover, the sensor arrangement comprises at least one sensor embedded on the circuit board, the at least one sensor configured to sense data related to one or more attributes associated with the hollow body. In essence, the circuit board provides the at least one sensor to have the electrical connections required for its functioning, i.e. sensing and transmitting data, such as via the at least one antenna pad. Optionally, the at least one sensor may be a magnetometer, a gyroscope, or an air pressure sensor.

Furthermore, the sensor arrangement comprises a communication interface embedded on the circuit board, the communication interface configured to transmit the sensed data. Herein, the term "communication interface" refers to an interface that ensure effective communication of the sensor arrangement for transmitting the sensed data. Optionally, the communication interface used may be EFR32BG22C224F512GM32-CR QFN32.

Optionally, the sensor arrangement is integrated on the inner surface of the valve such that a hollow space is to be left between the sensor arrangement for allowing a nozzle configured to be inserted into the valve. In essence, the sensor arrangement may be integrated to boundary walls of the valve, thus ensuring that there is enough hollow space left in between the sensor arrangement. The hollow space that is left is to be used for allowing the nozzle to be inserted into the valve.

Optionally, the nozzle is designed to enable at least one of: filling air in the hollow body, attaching an external arrangement to the valve.

Optionally, the sensor arrangement further comprises a rechargeable battery configured to provide input power to the sensor arrangement. In essence, the battery present in the sensor arrangement is responsible for providing the input power that is required for the sensor arrangement to work, wherein the battery may be rechargeable in nature, thus removing the need for replacing the battery again and again or to replace the valve along with the sensor arrangement once the battery is completely drained out. Optionally, the battery life for one complete charging cycle of the rechargeable battery (e.g., SSB or LiPo) may range between 5 minutes to 3 hours. Optionally, the rechargeable battery may be a solid-state battery.

Optionally, the rechargeable battery is coupled to the first end or the second end of the circuit board. Optionally the rechargeable battery may comprise a charging interface to receive the input power from an external arrangement, such as an external power source. Optionally, the rechargeable battery may be recharged using a wireless charging. Herein, the rechargeable battery is provided with electrical connections over the circuit board, thus allowing the rechargeable battery to be arranged in a desired location in the circuit board with such electrical connections.

Optionally, the external arrangement is a port for charging the rechargeable battery of the sensor arrangement. In essence, the port may be in form of surface mounted tabs, where the port may be connected, via the nozzle (e.g., pogo pins) in the valve, to the charger plug contacts (e.g., nRF52832) of the rechargeable battery to recharge the rechargeable battery. Alternative wording for term "port" can be charger port or charging port i.e. port via which charging (of electricity) can be made. In present disclosure same port can be used also to inflate the hollow body i.e. ball for example.

Optionally, in an exemplary scenario, the sensor arrangement may be configured to remain in sleep mode after the hollow body is being manufactured till the time when the hollow body is meant to be used for the first time, where the external arrangement is configured to activate the sensor arrangement when the hollow body is used for the first time.

Alternatively, the external arrangement may be a sound arrangement which produces a sound effect whenever the hollow body is moved. Optionally, the rechargeable battery is coupled to a first end or a second end of the circuit board. Herein, different embodiments of arranging the rechargeable battery on the circuit board may be associated with a design of the sensor arrangement and an application thereof.

Optionally, the sensor arrangement is configured to transmit the sensed data to an external database for analysis of the sensed data. Herein, the term "external database" refers to a database that is configured to receive and store sensor data transmitted by the sensor arrangement. Moreover, the sensed data that is received is further used by the database for in depth analysis, such as by a third party or the user, in order to draw out various inferences regarding the implications of the sensed data. Furthermore, the inferences drawn out by the analysis of the sensed data may be used as feedback for improving the quality of the hollow body. Optionally the external database may be in the form of a cloud database.

The present disclosure also relates to the method as described above. Various embodiments and variants disclosed above apply mutatis mutandis to the method.

Optionally, the method further comprises sensing, using a sensor arrangement of the present disclosure, one or more attributes associated with the hollow body.

Optionally, the one or more attributes is selected from at least one of: acceleration, velocity, air pressure, curve, position.

Optionally, the method further comprises creating an air pressure inside the hollow body via the second member.

DETAILED DESCRIPTION OF THE DRAWINGS

Referring to FIG. 1A, illustrated is a schematic illustration of a first member 100 present in an apparatus for installing a valve in a hollow body, in accordance with an embodiment of the present disclosure. As shown, the first member 100 comprises a first hollow elongate tube 102 having a first length and a first diameter. Moreover, the first member 100 comprises a first end 104 and a second end 106. Furthermore, the first member 100 comprises a protruding part 108 at the second end 106 of the first member 100.

Figure 1B:
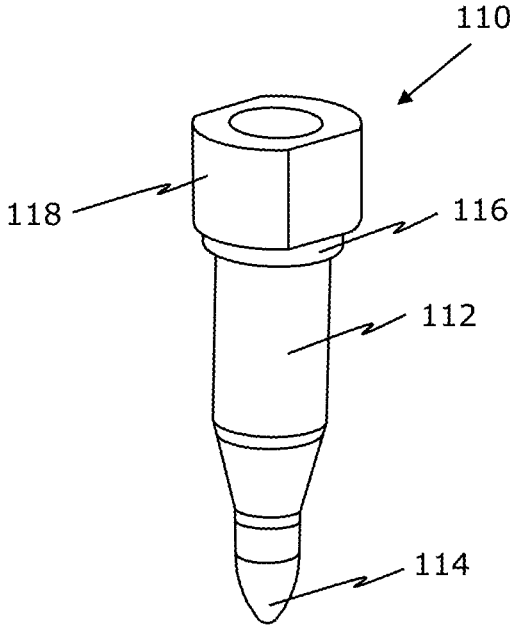

Referring to FIG. 1B, illustrated is a schematic illustration of a second member 110 present in the apparatus for installing the valve in the hollow body, in accordance with the embodiment of the present disclosure. As shown, the second member 110 comprises a second hollow elongate tube 112 having a second length and a second diameter. Moreover, the second member 110 comprises a first end 114 and a second end 116. Furthermore, the second member 110 comprises a protruding part 118 at the second end 116 of the second member 110.

Figure 2A:
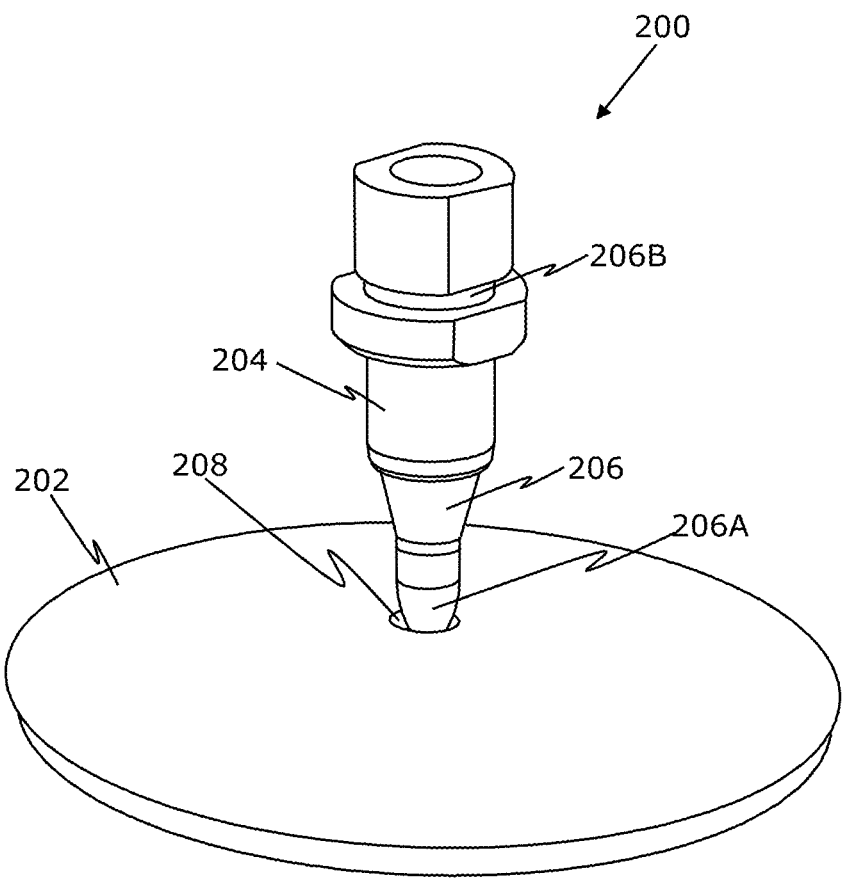
FIGS. 2A, 2B, 2C, 2D and 2E are schematic illustrations of working of the apparatus of FIG. 1 for installing a valve in a hollow body, in accordance with the embodiment of the present disclosure.
Figure 2B:
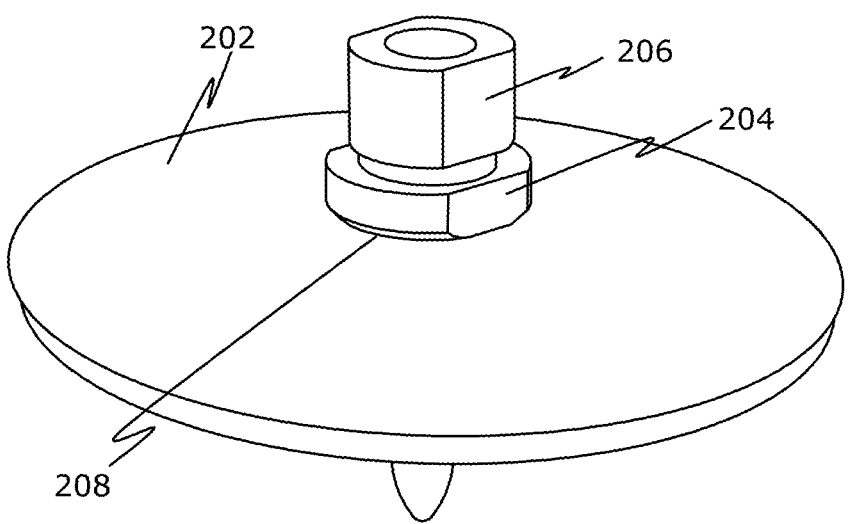
Figure 2C:
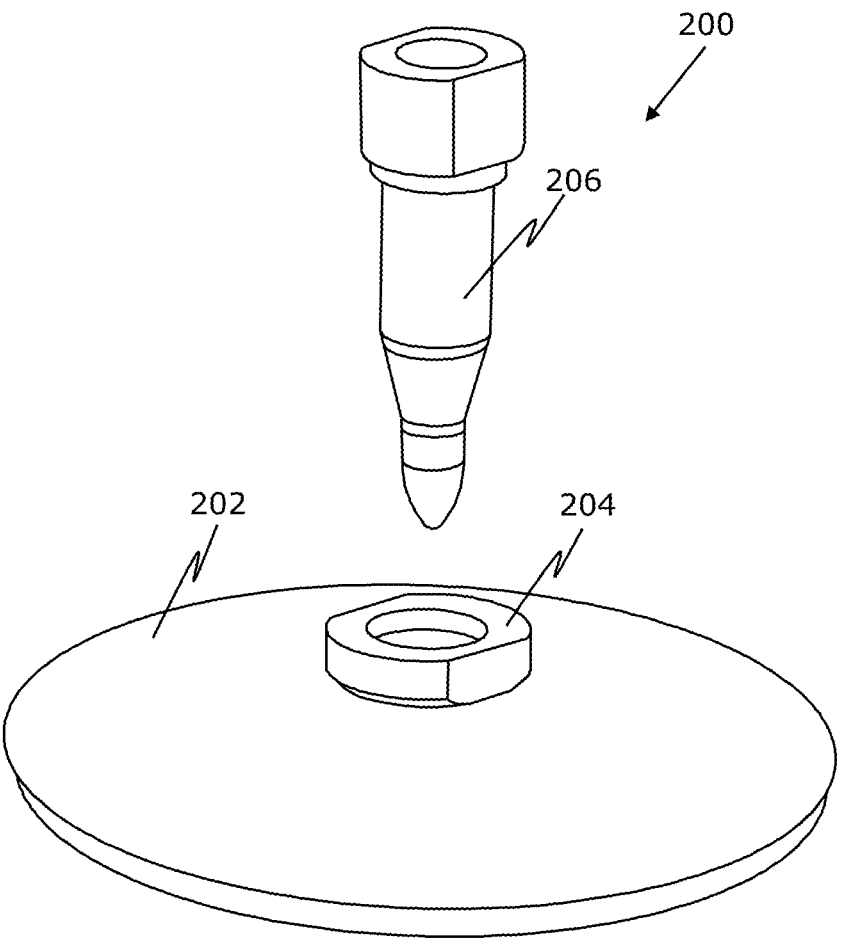
Figure 2D:
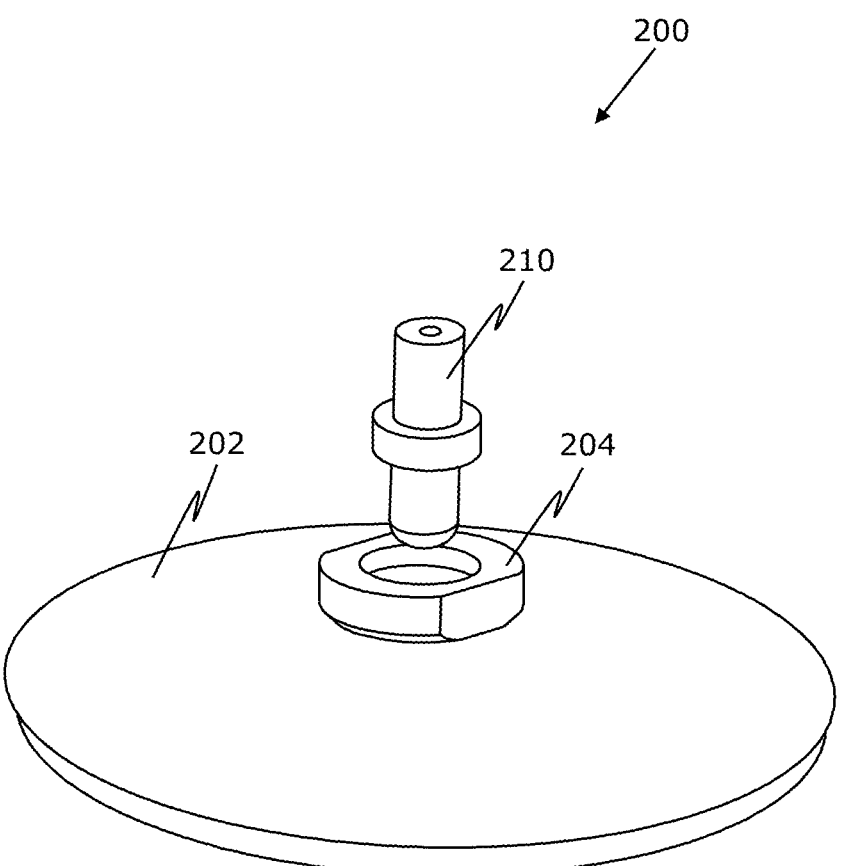
Figure 2E:
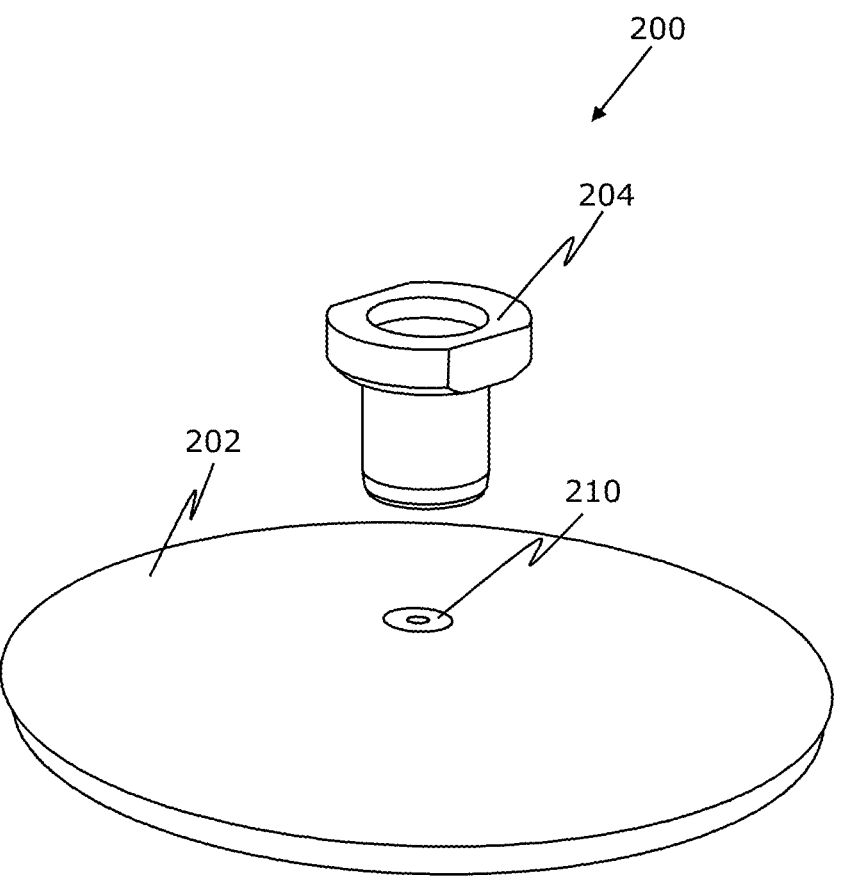

Referring to FIGS. 2A, 2B, 2C, 2D and 2E collectively, illustrated are schematic illustrations of working of the apparatus 200 for installing the valve 210 in the hollow body 202, in accordance with the embodiment of the present disclosure. As shown in FIG. 2A, the apparatus 200 comprises a second member 206 that accommodates a first member 204 circumferentially over the second member 204. Herein, the second member 206 is configured to be inserted into the hollow body 202, via a first end of the second member 206, in a hole 208 on an outer surface of the hollow body 202. As shown in FIG. 2B, the second member 206 is configured to be advanced inside the hollow body 202 while retaining the first member 204 against the hole 208 of the hollow body 202 to expand the hole 208. As shown in FIG. 2C, the second member 206 is configured to be withdrawn from the hollow body 202 while retaining the first member 204 against the hole 208 of the hollow body 202. As shown in FIG. 2D, the valve 210 is installed into the hollow body 202, via the first hollow elongate tube of the first member 204 retained against the hole 208 of the hollow body 202. As shown in FIG. 2E, the first member 204 is withdrawn upon the installation of the valve 210 into the hollow body 202.

Figure 3:
FIG. 3 is a sectional view of a valve installed in a hollow body, in accordance with the embodiment of the present disclosure.
Figure 3:
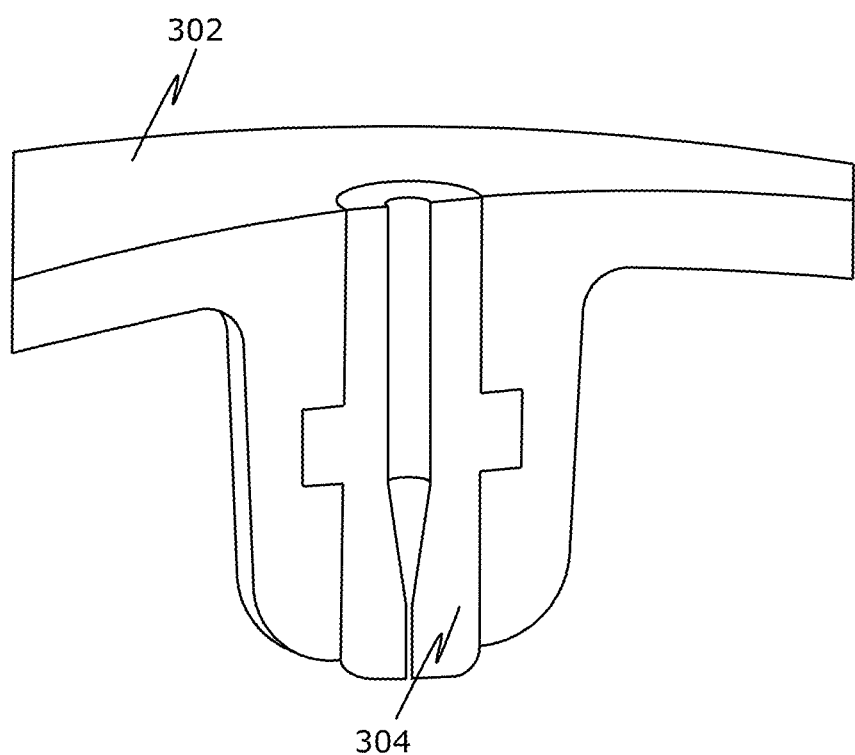

Referring to FIG. 3, illustrated is a sectional view 300 of a valve 304 installed in a hollow body 302, in accordance with the embodiment of the present disclosure. Herein, the material of the hollow body 302 stretches around the hole of the hollow body 302. The stretched hole of the hollow body 302 enables installation of the valve 304 in the hollow body 302.

Figure 4A:
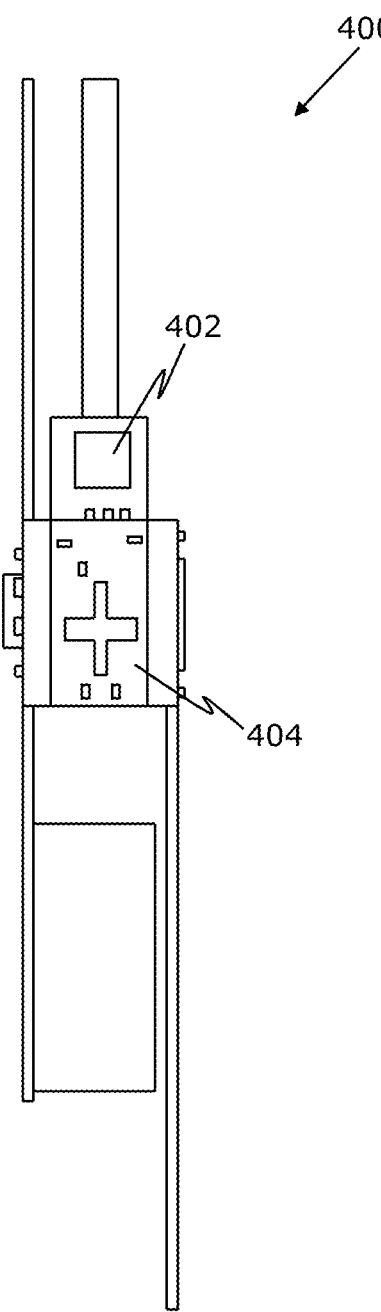
FIGS. 4A, 4B, 4C and 4D are different side views of a sensor arrangement for sensing data inside a hollow body, in accordance with an embodiment of the present disclosure.
Figure 4B:
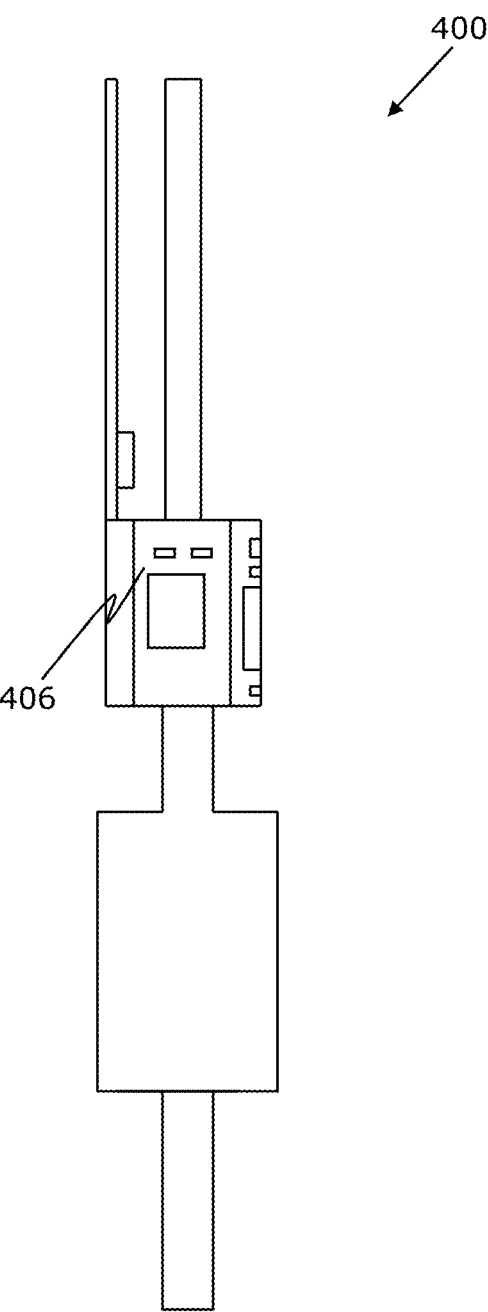
Figure 4C:
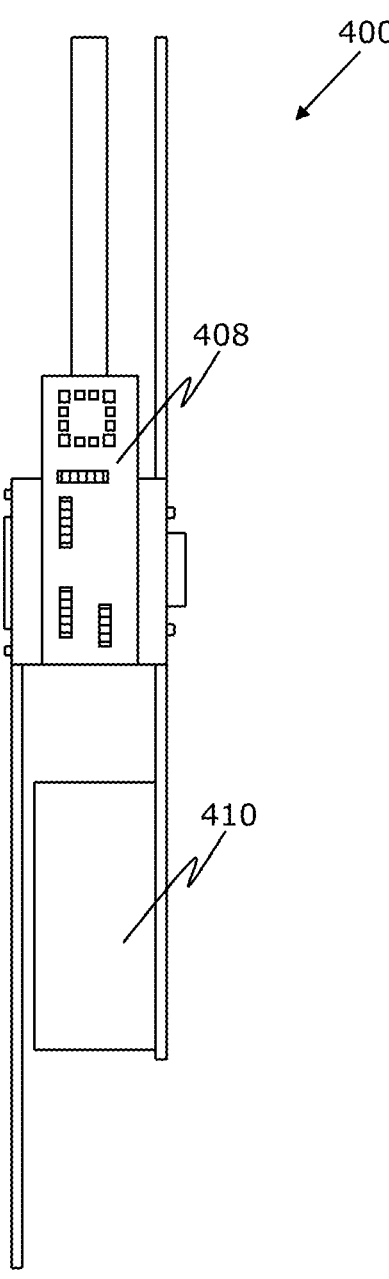
Figure 4D:
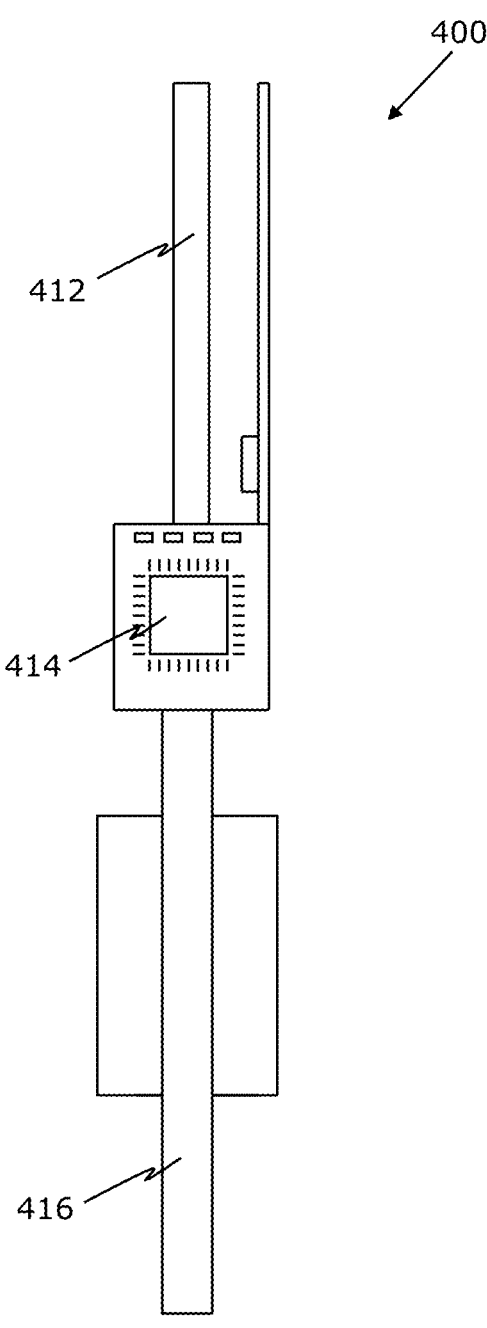

Referring to FIGS. 4A, 4B, 4C and 4D, illustrated are different side views of a sensor arrangement 400 for sensing data inside a hollow body, in accordance with an embodiment of the present disclosure. As shown in FIG. 4A, the sensor arrangement 400 comprises at least one sensor 402 and at least one timing device 404. As shown in FIG. 4B, the sensor arrangement 400 comprises of a charger circuit 406 for charging the sensor arrangement 400. As shown in FIG. 4C, the sensor arrangement 400 comprises of discrete chips 408 and a rechargeable battery 410. As shown in FIG. 4D, the sensor arrangement 400 comprises of a charger plug contacts 412, a communication interface 414 and an antenna pad 416.

Figure 5:
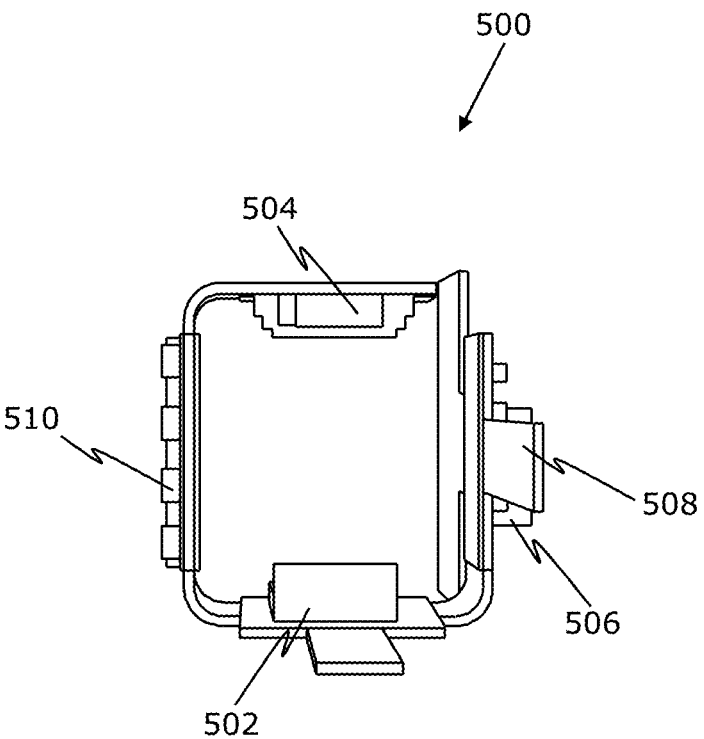
FIG. 5 is a top view of a sensor arrangement for sensing data inside a hollow body, in accordance with the embodiment of the present disclosure.

Referring to FIG. 5, illustrated is a top view of the sensor arrangement 500 for sensing data inside a hollow body, in accordance with the embodiment of the present disclosure, in accordance with the embodiment of the present disclosure.

Figure 6A:
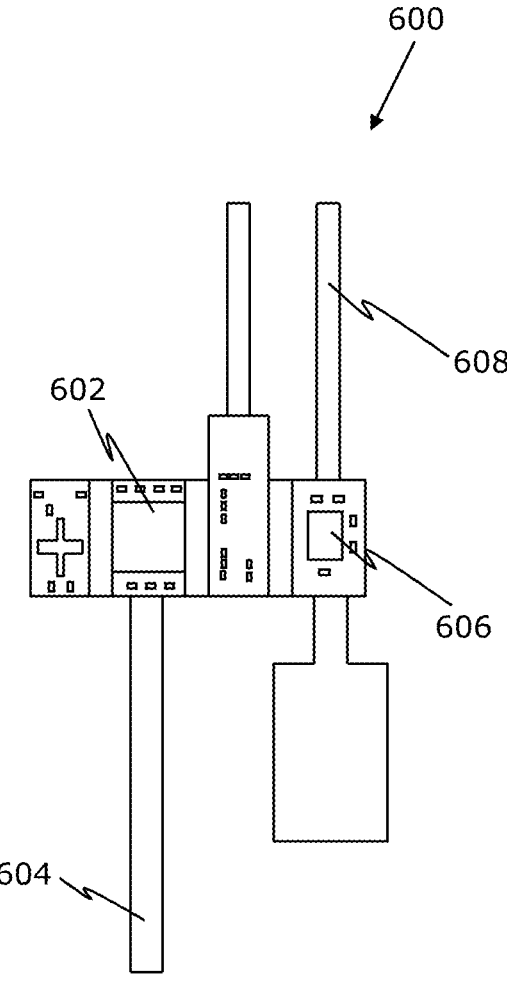
FIGS. 6A and 6B are perspective views of a sensor arrangement for sensing data inside a hollow body, in accordance with the embodiment of the present disclosure.
Figure 6B:
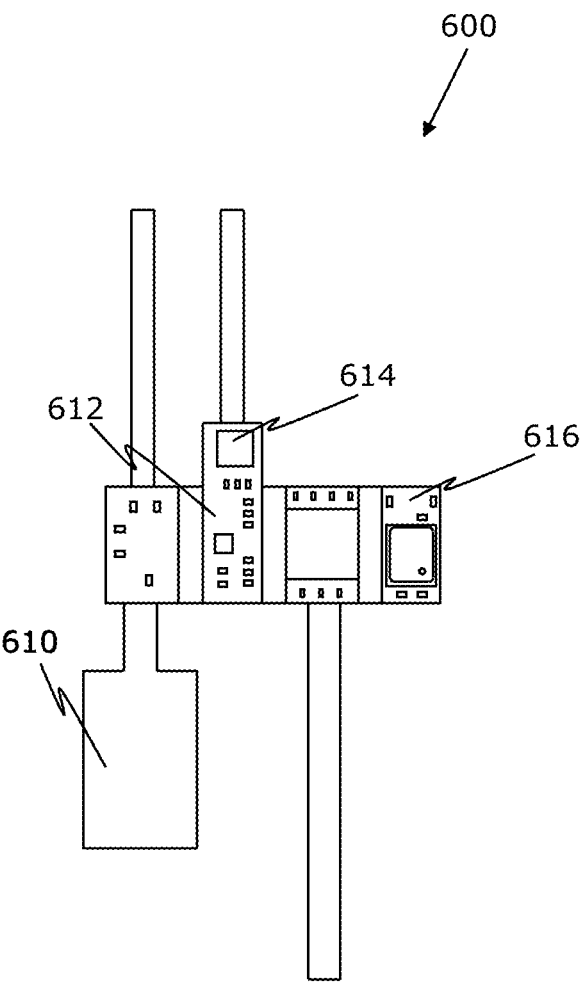

Referring to FIGS. 6A and 6B, illustrated are perspective views of a sensor arrangement 600 for sensing data inside a hollow body, in accordance with the embodiment of the present disclosure.

Figure 7:
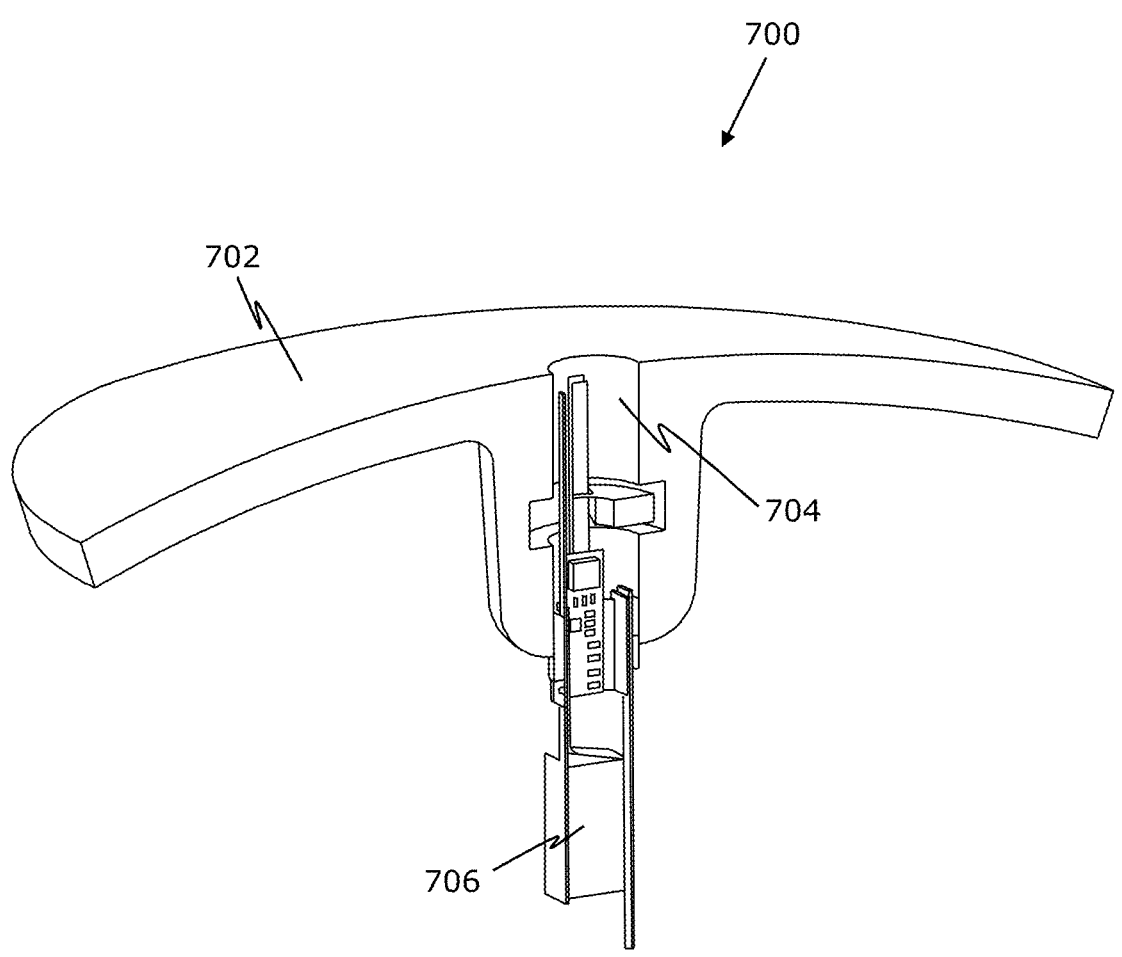
FIG. 7 is a sectional view of integration of the sensor arrangement to a valve installed in the hollow body, in accordance with the embodiment of the present disclosure.

Referring to FIG. 7, illustrated is a sectional view 700 of integration of the sensor arrangement 706 to a valve 704 installed in a hollow body 702, in accordance with the embodiment of the present disclosure. Herein, the sensor arrangement 706 is at least partly integrated to the valve 704.

Figure 8B:
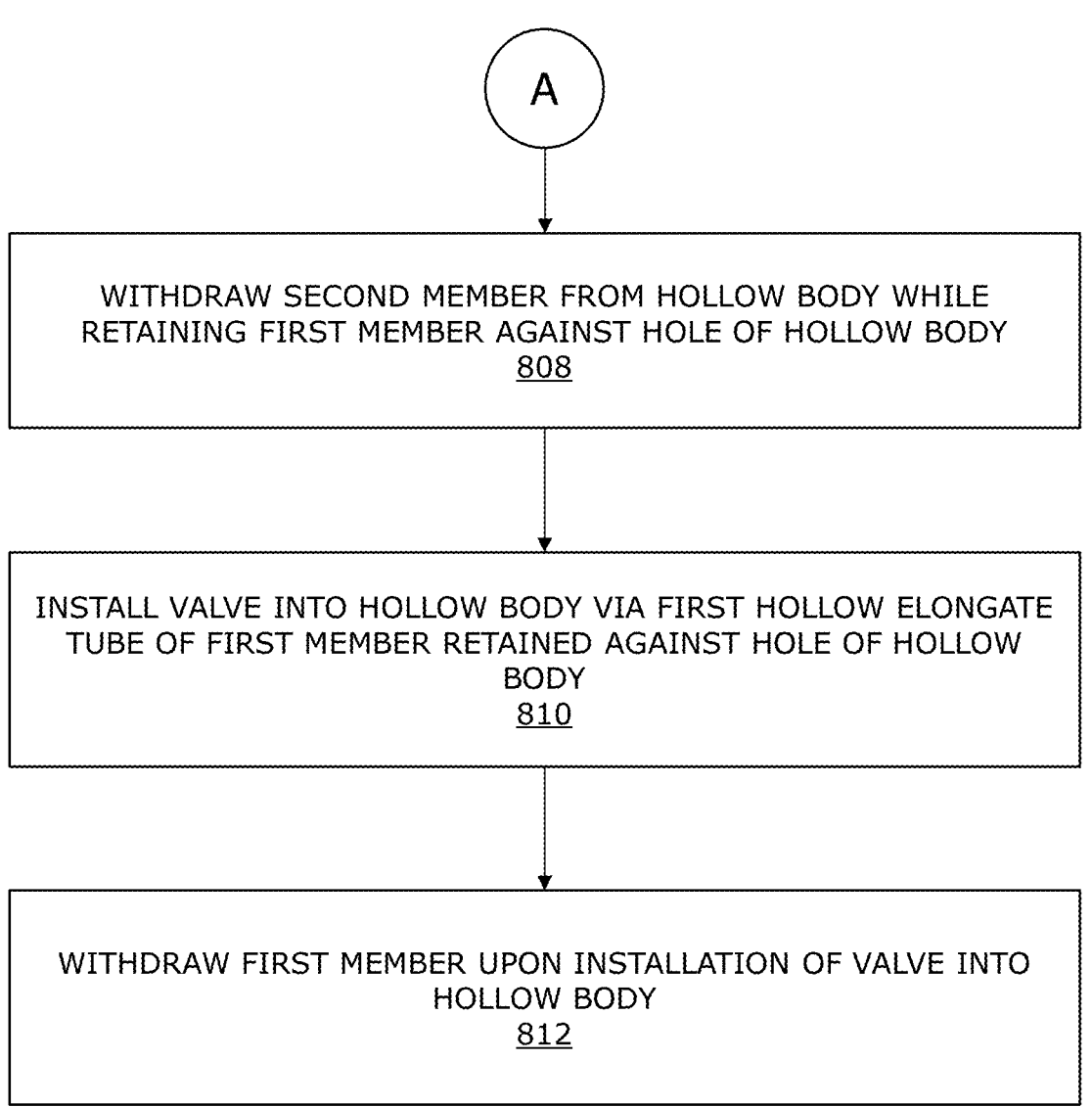

Referring to FIGS. 8A and 8B, there is shown a flowchart 800 depicting steps of a method for installing a valve in a hollow body, in accordance with an embodiment of the present disclosure. At step 802, a first member is arranged circumferentially over a second member at a complementary part, the first member having a first hollow elongate tube of a first length and a first diameter and the second member having a first end, a second end, and a second hollow elongate tube of a second length between the first end and the second end and a second diameter. At step 804, the second member is inserted, via the first end thereof, in a hole on an outer surface of the hollow body. At step 806, the second member is advanced inside the hollow body while retaining the first member against the hole of the hollow body to expand the hole. At step 808, the second member is withdrawn from the hollow body while retaining the first member against the hole of the hollow body. At step 810, the valve is inserted into the hollow body via the first hollow elongate tube of the first member retained against the hole of the hollow body. At step 812, the first member is withdrawn upon the installation of the valve into the hollow body.

The steps 802, 804, 806, 808, 810 and 812 are only illustrative and other alternatives can also be provided where one or more steps are added, one or more steps are removed, or one or more steps are provided in a different sequence without departing from the scope of the claims herein.

Figure 9A:
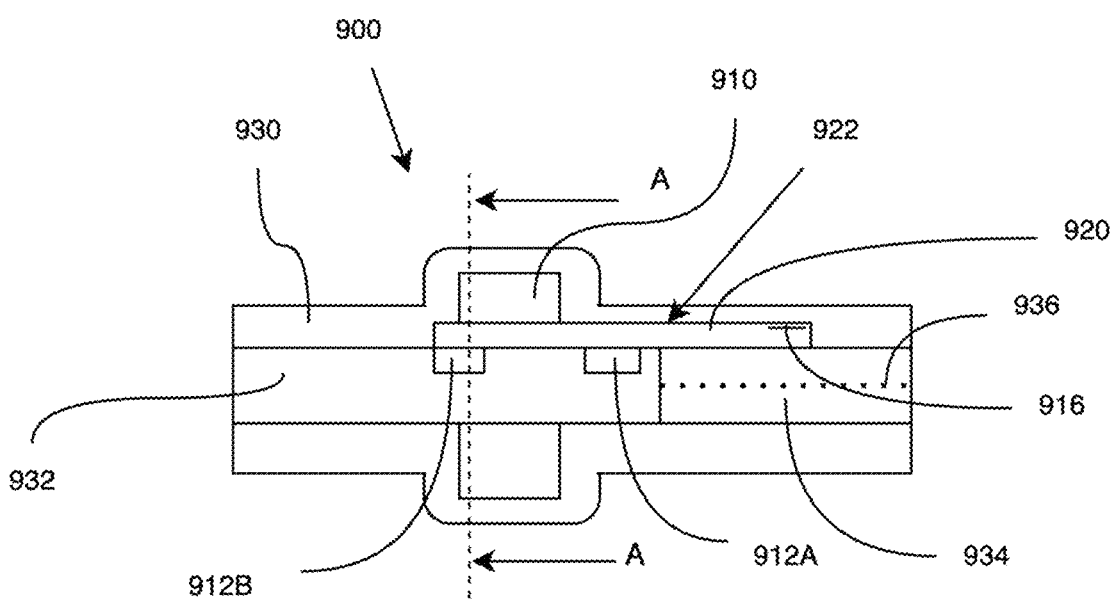
Figure 9A:
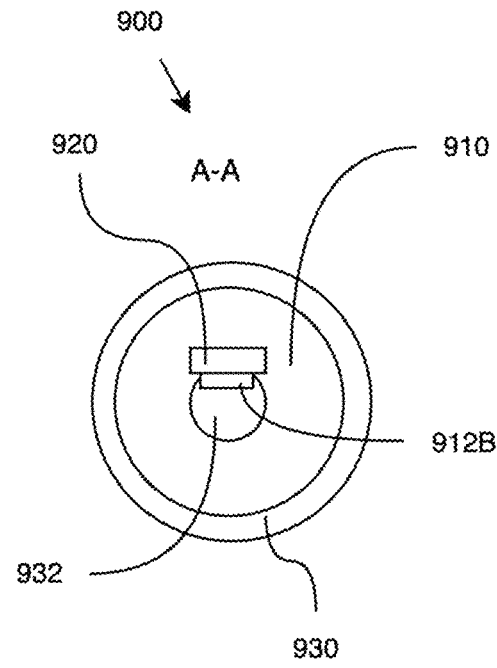

FIG. 9A is an illustration of a cross section of a valve 900 comprising a sensor arrangement 922. The sensor arrangement comprises a printed circuit board 920 in which relevant components such as sensors, charger electrics, communication electronics are installed. The printed circuit board 920 comprises an antenna 916 for communicating measured sensor data. Battery 910 is charged via a first charging pad 912A and a second charging pad 912B. The charging pads can be spring loaded charging pads or pogo pins or alike configured to receive a plug of charger.

The sensor arrangement 922 is covered with a body part 930. The body part 930 can be implemented as a moulded structure around the sensor arrangement 922. Example material for this can be elastomeric polymer. The body part comprises a port 932 for receiving a charger plug. The charging pads are arranged inside of the port. The valve comprises a channel 936 (marked with dashed line). The channel 936 is normally airtight channel and it is arranged to go thru middle portion of a stopper part 934.

Figure 9B:
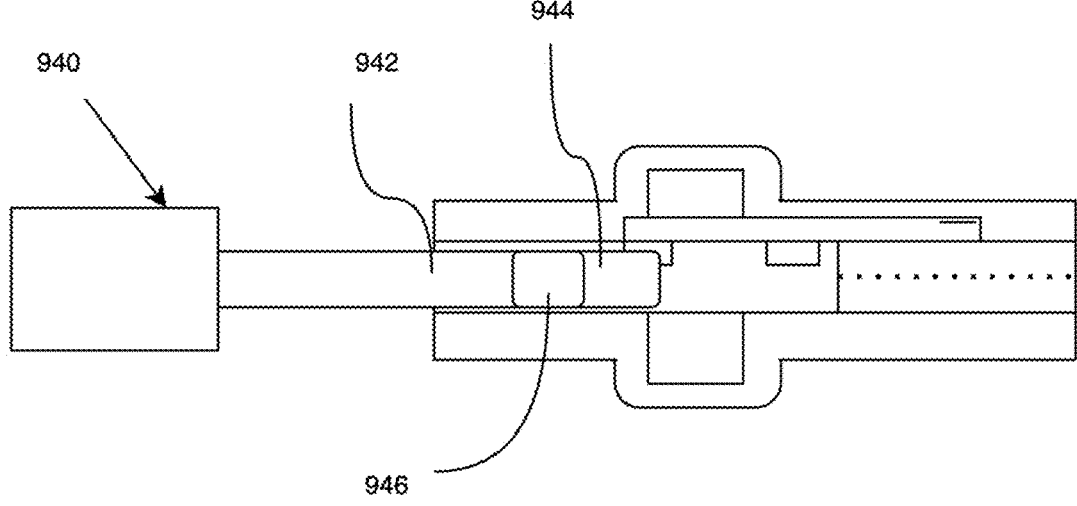
Figure 9C:
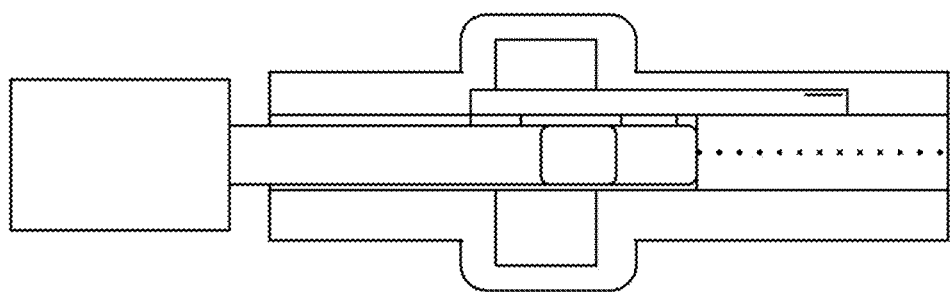

FIG. 9B is an illustration of a charger plug 940, being inserted, partly, in to port of the valve. The charger plug 940 comprises a first conducting portion 942 and a second conducting portion 944 separated with insulating portion 946. FIG. 9C is an illustration of situation in which the charger plug 940 is fully inserted in the valve. The stopper part prevents charger plug penetration to predetermined amount. This way conducting portions are in contact with charger pads and the channel of the stopper part is closed (keeping air inside of the hollow body during charging).

Figure 9D:
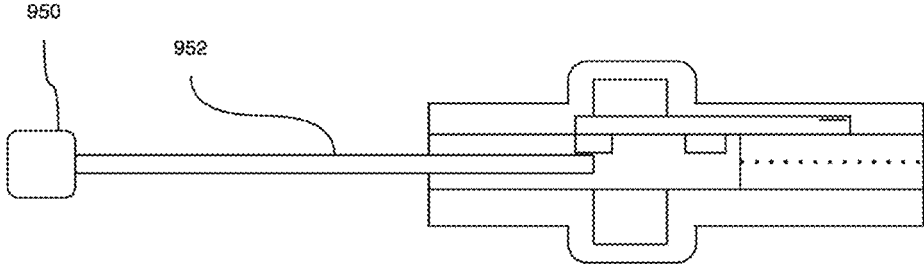
Figure 9E:
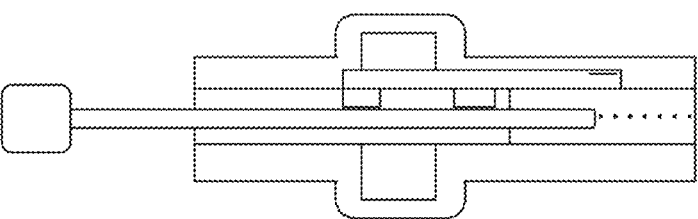
Figure 9F:
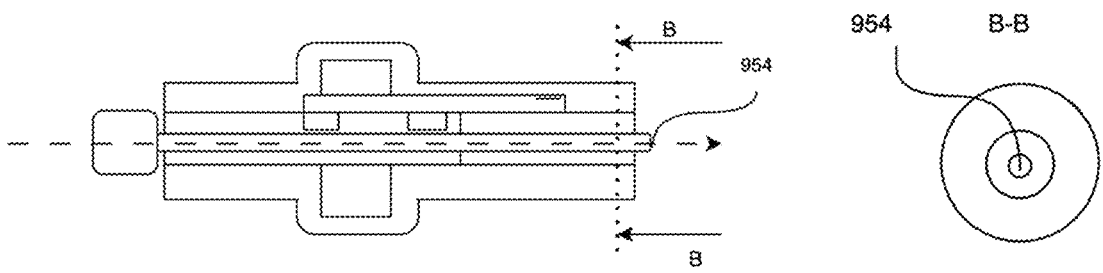

FIG. 9D is an illustration of inflation needle 950 for providing air inside of the hollow body when the needle part 952 of the inflation needle 950 is partly inserted in the valve. In FIG. 9D the needle is inside of the port portion of the valve. FIG. 9E is an illustration of a situation in which the inflation needle 950 is inserted partly inside of the channel of the stopper part. FIG. 9F is illustration on which the inflation needle 950 is fully inserted and has penetrated thru the channel. Air (indicated with arrow having dashed line) can be now pumped inside of the follow body via orifice 954 of the inflation needle 950.

The stopper part can be same material as the (moulded) body part or it can be different material. The material for the stopper part is such that the channel is fully closed when there is no inflation needle inserted and the material provides sufficient elasticity to receive inflation needle.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A valve comprising
   a sensor arrangement for sensing data inside a hollow body, wherein the sensor arrangement is embedded inside a body of the valve;
   a charger port having a first opening for receiving a charger plug or inflation needle, and a stopper part, wherein the stopper part comprises a channel which is dimensioned to allow the inflation needle to penetrate the hollow body while preventing the charger plug to penetrate the hollow body;
   wherein the stopper part is made from an elastic material to keep the channel airtight when the inflation needle is removed from the channel; and
   wherein the sensor arrangement comprises a printed circuit board, charging pads arranged to be electrically connected to the charger plug via the charger port, a sensor, a communication interface, an antenna and a chargeable battery.

2. The valve according to claim 1, wherein the stopper part and the body of the valve are made from same material.

3. The valve according to claim 1, wherein the stopper part is flexible rubber comprising the channel and the body part is elastomeric polymer.

4. The valve according to claim 1, wherein a combined length of the channel and a depth of the charger port from the first opening to the stopper part, is greater than length of the charging plug to prevent charger plug from penetrating to the hollow body.

5. The valve according to claim 4, wherein the combined length of the channel and the depth of the charger port from the first opening to the stopper part is less than length of the inflation needle to allow providing air to the hollow body.

* * * * *